US012696024B2

(12) United States Patent
Neuble, Jr.

(10) Patent No.: US 12,696,024 B2
(45) Date of Patent: Jul. 28, 2026

(54) SOUND CONDITIONING DEVICE

(71) Applicant: Michael Neuble, Jr., View Park, CA (US)

(72) Inventor: Michael Neuble, Jr., View Park, CA (US)

( * ) Notice: Subject to any disclaimer, the term of this patent is extended or adjusted under 35 U.S.C. 154(b) by 182 days.

(21) Appl. No.: 18/792,850

(22) Filed: Aug. 2, 2024

(65) Prior Publication Data

US 2026/0039988 A1 Feb. 5, 2026

(51) Int. Cl.
*H04R 3/02* (2006.01)
*H04R 1/08* (2006.01)
*H04R 3/00* (2006.01)

(52) U.S. Cl.
CPC ......... *H04R 1/086* (2013.01); *H04R 2410/07* (2013.01)

(58) Field of Classification Search
CPC ............................ H04R 1/086; H04R 2410/07
USPC ................................................ 381/73.1, 122
See application file for complete search history.

(56) References Cited

U.S. PATENT DOCUMENTS

2020/0322708 A1* 10/2020 Johnson ................ H04R 1/083

* cited by examiner

*Primary Examiner* — Ammar T Hamid
(74) *Attorney, Agent, or Firm* — ONE LLP

(57) ABSTRACT

A sound conditioning device. The device includes a shield comprising an elongated plate having a front face and a rear face. A fastener is coupled to the rear face of the shield, where the fastener is adapted to detachably couple to a boom of a headset having a voice microphone. A sound conditioning material is coupled to the rear face, wherein the conditioning material overlays the voice microphone to encapsulate the voice microphone and suppress ambient sound detected by the microphone.

12 Claims, 4 Drawing Sheets

SOUND CONDITIONING DEVICE

TECHNICAL FIELD

The present disclosure generally relates to a sound conditioning device, and more specifically, to a device used to condition ambient sound from being detected by a headset microphone.

BACKGROUND

In sports, headsets are commonly used for two-way communication between coaches and staff. These headsets commonly include a voice microphone supported by a boom. However, due to the noisy ambient environment of most sporting events, ambient sounds detected by the voice microphone often drown out the voices of the headset user. Thus, a need therefore exists for a device that conditions and/or blocks out ambient sounds from being detected by the voice microphone of a headset to acoustically isolate the user's voice from the external sounds.

Further, during certain sporting events, coaches may communicate plays or other information to other coaches, staff, or players through their headsets. Oftentimes, when a coach is "play calling," the coach may cover the voice microphone and his or her mouth with their hands or with their playbooks to prevent cameras or the opposing team from reading their mouth. Thus, a further need exists for a device that shields the mouth of a headset user as the user is communicating sensitive information to another person through the headset.

SUMMARY

The present disclosure provides a sound conditioning device that may be coupled to the microphone boom of a headset. The device includes a shield comprising an elongated plate having a front face and a rear face, and a fastener coupled to the rear face of the shield, where the fastener is adapted to detachably couple to a boom of a headset having a voice microphone. A sound conditioning material is coupled to the rear face, wherein the conditioning material overlays the voice microphone to encapsulate the voice microphone and suppress ambient sound detected by the microphone.

The present disclosure provides another sound conditioning device that may be coupled to the microphone boom of a headset. The device includes a shield comprising an elongated plate having a front face and a rear face. A fastener is coupled to the rear face of the shield, where the fastener is adapted to detachably couple to a boom of a headset having a voice microphone. A sound conditioning material is coupled to the rear face, wherein the conditioning material comprises a pocket for receiving the voice microphone to partially enclose the voice microphone to minimize ambient sound detected by the microphone.

The disclosure herein is a summary of the invention and not an extensive overview of all contemplated embodiments. It should be appreciated that many other features, applications, embodiments, implementations and/or variations of the disclosed technology will be apparent from the accompanying drawings and from the following detailed description. While multiple implementations are disclosed, the drawings and detailed description are to be regarded as illustrative in nature and not restrictive.

BRIEF DESCRIPTION OF THE DRAWINGS

This disclosure may be better understood by referring to the following figures. The components in the figures are not necessarily to scale, emphasis instead being placed upon illustrating the principles of the disclosure. In the figures, the reference numerals designate corresponding parts throughout the different views.

DETAILED DESCRIPTION

FIGS. 1-5 illustrate examples of various implementations of a sound conditioning device. As described herein, the device includes a shield comprising an elongated plate having a front face and a rear face, and a fastener coupled to the rear face of the shield. The fastener is adapted to be detachably coupled to a boom of a headset having a voice microphone. A sound conditioning material is coupled to the rear face. The conditioning material is adapted to overlay the voice microphone to encapsulate the voice microphone and minimize ambient sound received by the microphone.

Figure 1:
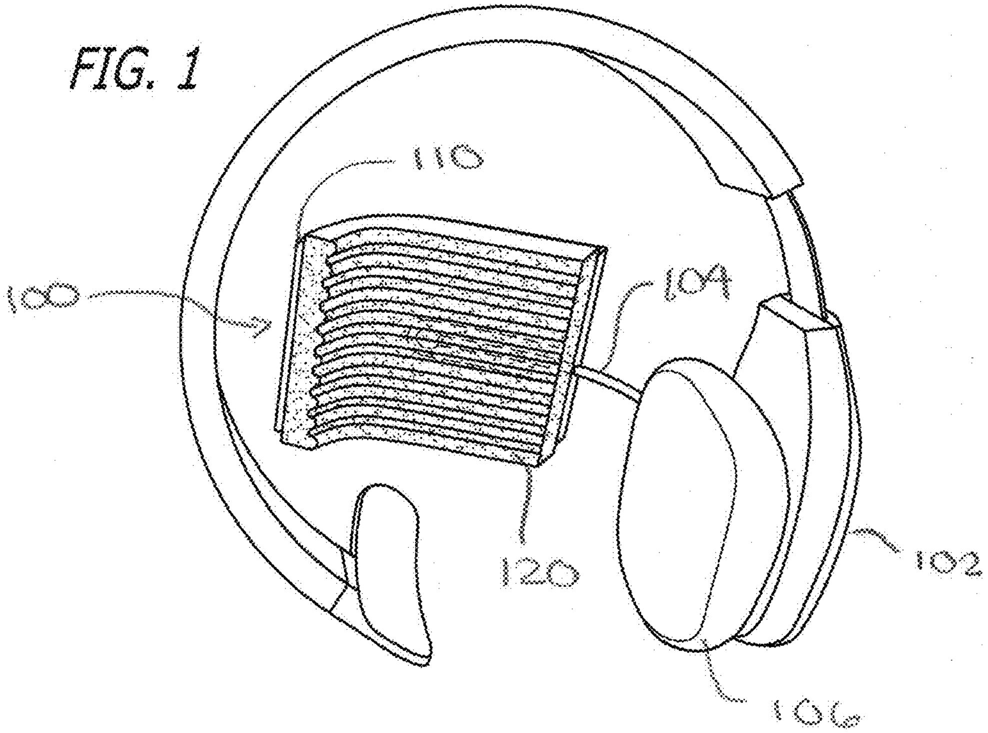
FIG. 1 is a perspective view showing a first example of a sound conditioning device of the present disclosure applied to the voice microphone of a headset.

FIG. 1 is a perspective view of a sound conditioning device 100 according to the teachings of the present disclosure. In this example, the device 100 is coupled to a headset 102 having a microphone boom 104 extending from an earpiece 106. As shown, the sound conditioning device 100 includes a shield 110 and sound conditioning material 120 coupled to a rear face of the shield 110.

Figure 2:
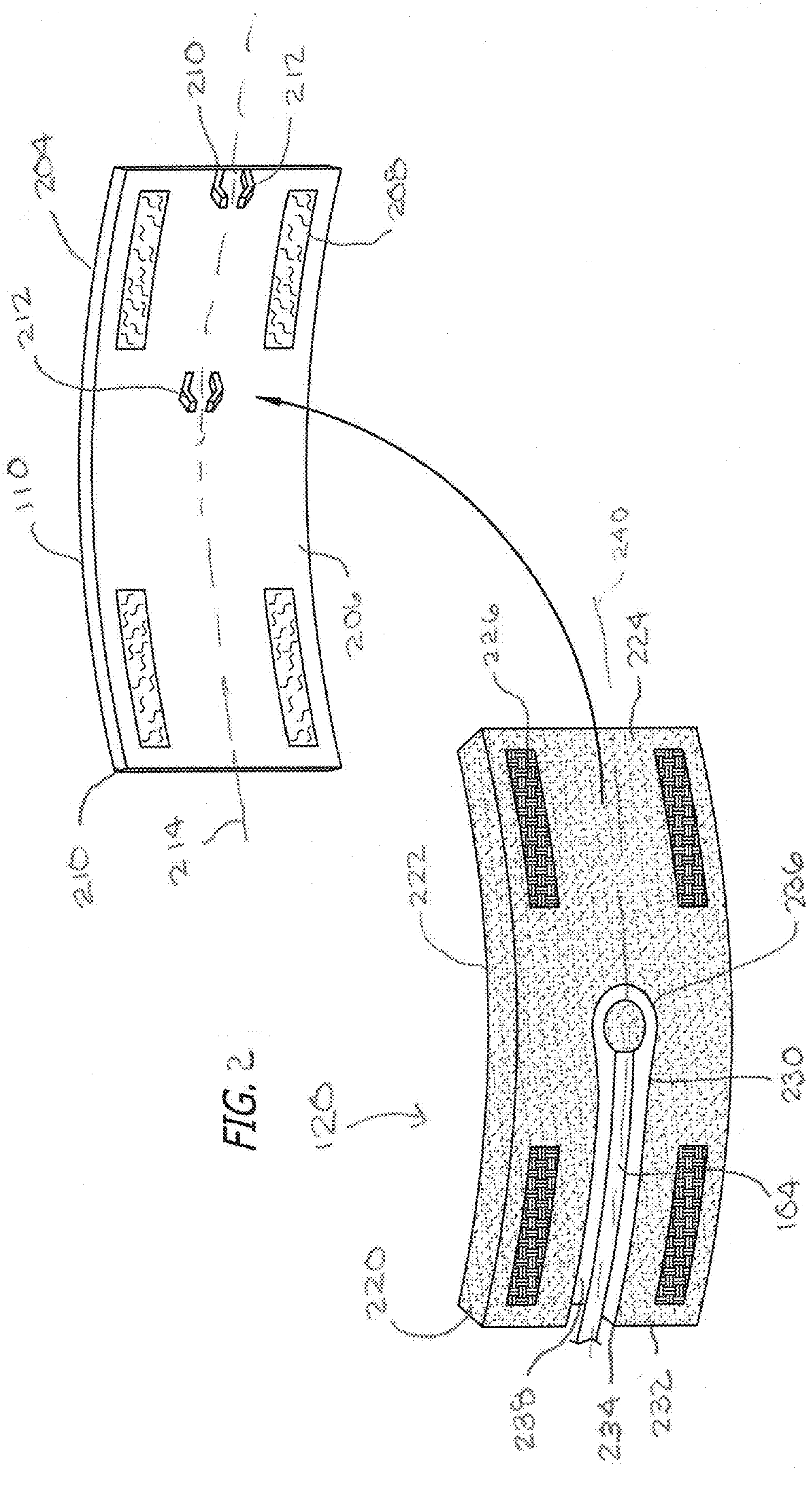
FIG. 2 is an exploded view of the sound conditioning device of FIG. 1.

FIG. 2 is an exploded view of the sound conditioning device 100. As shown, the shield 110 may comprise an elongated planar plate 202 having a front face 204 and a rear face 206. In some embodiments, the plate 202 may be constructed to a height of 3 inches, a width of 6 inches, and a thickness of 0.125 inches. In some embodiments, the corners 210 of the plate 202 may be rounded (not shown) for aesthetic and/or safety purposes.

In preferred embodiments, the plate 202 may be constructed to comprise a slightly concave curvature. Such construction is helpful in shielding a headset microphone from ambient sound or air. The plate 202 may be made of aluminum, stainless steel, plastic, ceramic, or any other suitable material.

In some implementations, words, logos, or images may be inscribed on the front face 204 of the shield 110. For example, the logo or name of a sports team.

In other implementations, hook and loop material 208 may be affixed to the rear face 206 of the shield 110 at various locations to detachably secure the conditioning material 120 to the shield 110, as described in further detail below. The hook and loop material 208 may be affixed to the rear face 206 by glue, bond, or any other suitable adhesive.

As further shown, a fastener 210 may be affixed to the rear face 206 of the shield 110. In the embodiment shown, the fastener 210 comprises a pair of clamp-type fastening clips 212 aligned along a centerline 214 of the plate 202. The fastening clips 212 are adapted to detachably receive a microphone boom of a headset, such that the boom can snap into and be released from the fastening clips 212. The fastening clips 212 are also adapted, by interference fit, to secure the shield 110 to the microphone boom to prevent radial rotation about the boom or slippage of the shield 110 from the boom. For example, a fastening clip 212 may be affixed to the rear face 206 at a location corresponding to the distal end of the microphone boom, such that the fastening clip 212 may be coupled to the boom near the voice microphone to prevent shield slippage, as further described below. In other implementations, the fastener 210 may comprise vices, brackets, restraining straps, or any other suitable means. While it is preferred that the shield 110 is detachable coupled to the microphone boom, in some implementations, the shield 110 may be permanently attached to the microphone boom.

As shown, the sound conditioning material 120 may include a planar sheet of pliable material 220 having a front surface 222 and a rear surface 224. In some embodiments, the sheet 202 may be constructed to a height of 3 inches, a width of 6 inches, and a thickness of 0.5 to 0.75 inches. In preferred embodiments, the height and width dimensions of the sound conditioning material 120 should correspond to the height and width dimensions of the shield 110.

The planar sheet 220 may be made of acoustic foam, rubber, cloth, or any other suitable sound-absorbing material. The sheet 220 may be constructed of flexible material such that it may conform to the concave curvature of the shield plate 202 when it is attached thereto. In some embodiments, the edges of the sheet 220 may also be rounded (not shown) to correspond to rounded edges of the shield plate 202.

The front surface 222 of the sound conditioning material 120 is adapted to be positioned near the user's mouth. The front surface 222 may include a plurality of ridges, egg crate, or cone-shaped constructions (not shown) to shape or condition the sound waves passing therethrough.

The rear surface 224 of the sound conditioning material 120 is adapted to abut the rear face 204 of the shield 110. In some implementations, as shown, hook and loop material 226 may be affixed to the rear surface 224 of the sound conditioning material 120 at locations corresponding to hook and loop material 208 on the rear face 206 of the shield 110. The hook and loop material 226 may be affixed to the rear surface 222 by glue, bond, or any other suitable adhesive. The hook and loop material enables the sound conditioning material 120 to be detachably coupled to the shield 110 for sanitary purposes. Namely, the hook and loop material enables the sound conditioning material 120 to be detached from the shield 110 and discarded after each use.

In other implementations, the sound conditioning material 120 may be permanently affixed to the shield 110 for heavy duty uses.

In the example shown, a groove 230 may be formed along a centerline 240 of the sheet 220. The groove 230 extends inward from an open end 234 formed at an outer end 232 of the sheet 220 to a closed end 236 formed in central portion of the sheet 220. The groove 220 may be constructed to a depth short of the thickness of the sheet 220, thereby defining a sleeve 238 for receiving and enclosing the microphone boom 104 of the headset. The groove 220 may be constructed to any suitable dimensions.

Figure 3:
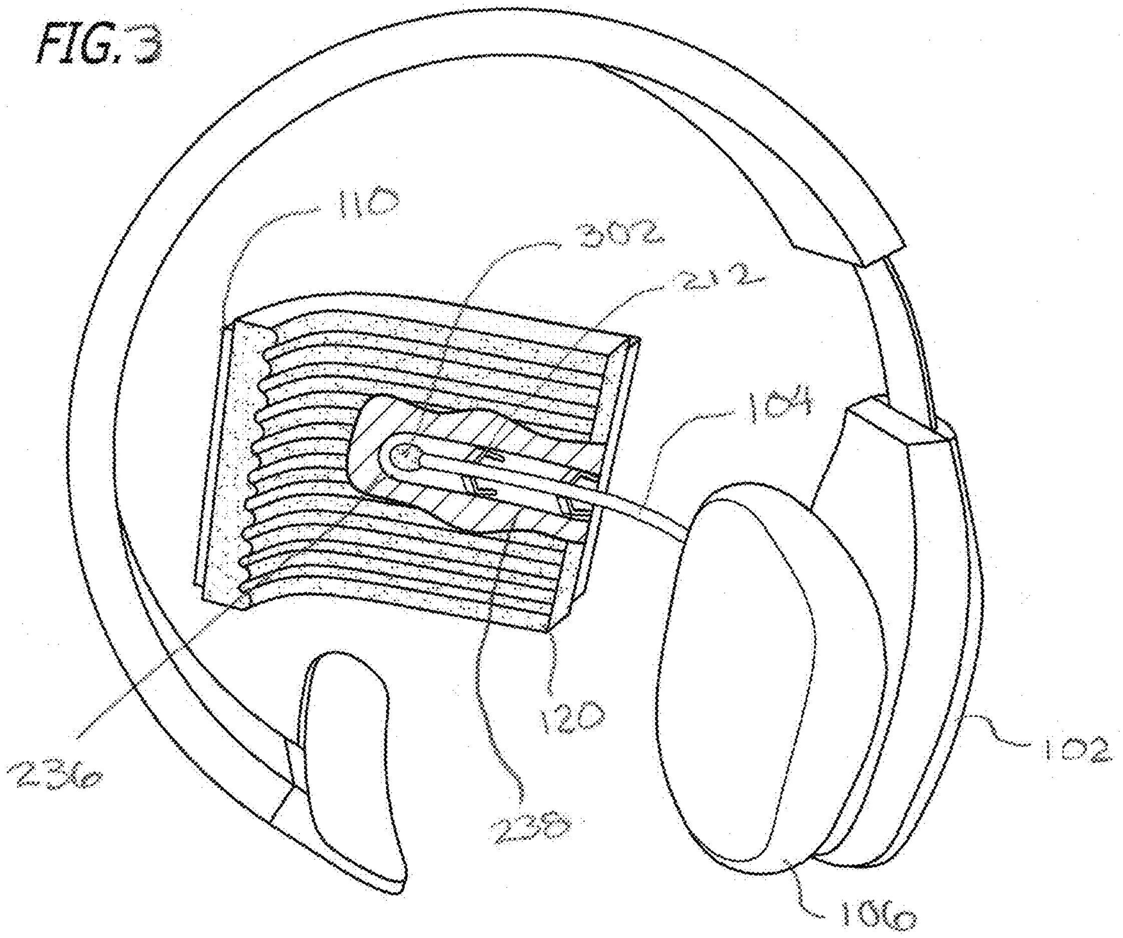
FIG. 3 is another perspective view showing the sound conditioning device of FIG. 1 applied to the voice microphone of a headset.

FIG. 3 is another perspective view of the sound conditioning device 100 coupled to headset 102. In use, the shield 110 may first be attached to the microphone boom 104 by snapping the boom into the fastening clips 212. As shown, it is preferred to construct the shield 110 such that a fastening clip 212 is positioned near the voice microphone 302 of the microphone boom 104 to minimize lateral movement of shield 110 along the microphone boom 104 (i.e., to prevent the shield 110 from slipping off of the microphone boom 110). In the same way, the closed end 236 of the sleeve 238 also limits lateral movement of the shield 110 along the microphone boom 104.

Once the shield 110 is attached to the microphone boom 104, then the user may attach the sound conditioning material 120 to the shield 110 via the hook and loop fasteners 208 and 226. When the sound conditioning material 120 is attached to the shield 110, the sound conditioning material 120 encapsulates the voice microphone 302 to condition all sound detected by the voice microphone 302 and suppress ambient sounds that may interrupt or cancel sound waves propagating from the user's mouth (i.e., the user's voice). Positioned proximal the user's mouth, the shield 110 screens or shields the user's mouth from the wind and blocks out ambient pressure waves from canceling the pressure waves generated by the user's voice. In this way, the voice of a user of the device may be detected clearly by the voice microphone, even though the user may be speaking in a noisy or windy environment.

Figure 4:
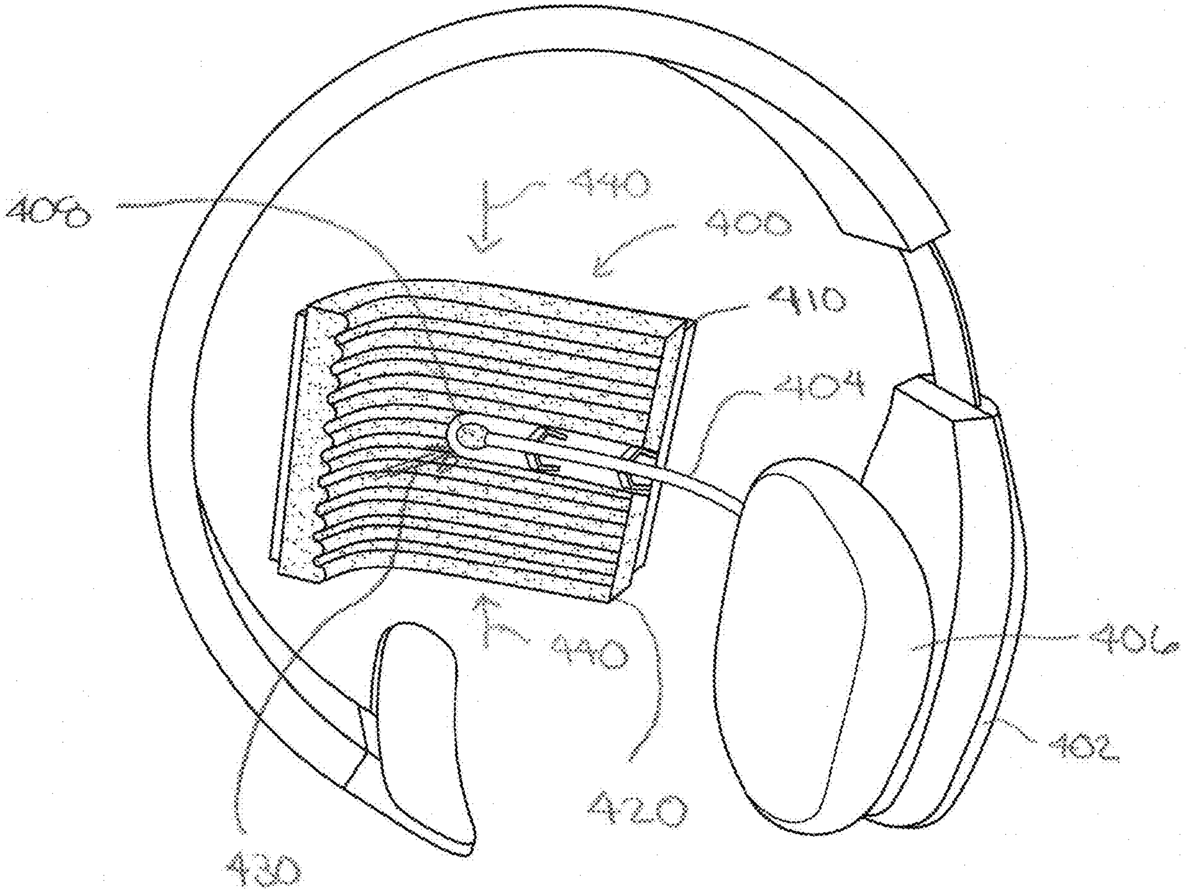
FIG. 4 is a perspective view showing a second example of a sound conditioning device of the present disclosure applied to the voice microphone of a headset.

FIG. 4 is a perspective view of another implantation of a sound conditioning device 400 according to the teachings of the present disclosure. In this example, the device 400 is coupled to a headset 402 with a microphone boom 404 extending from an earpiece 406. As shown, the sound conditioning device 400 includes a shield 410 and sound conditioning material 420 coupled to a rear face of the shield 410.

Figure 5:
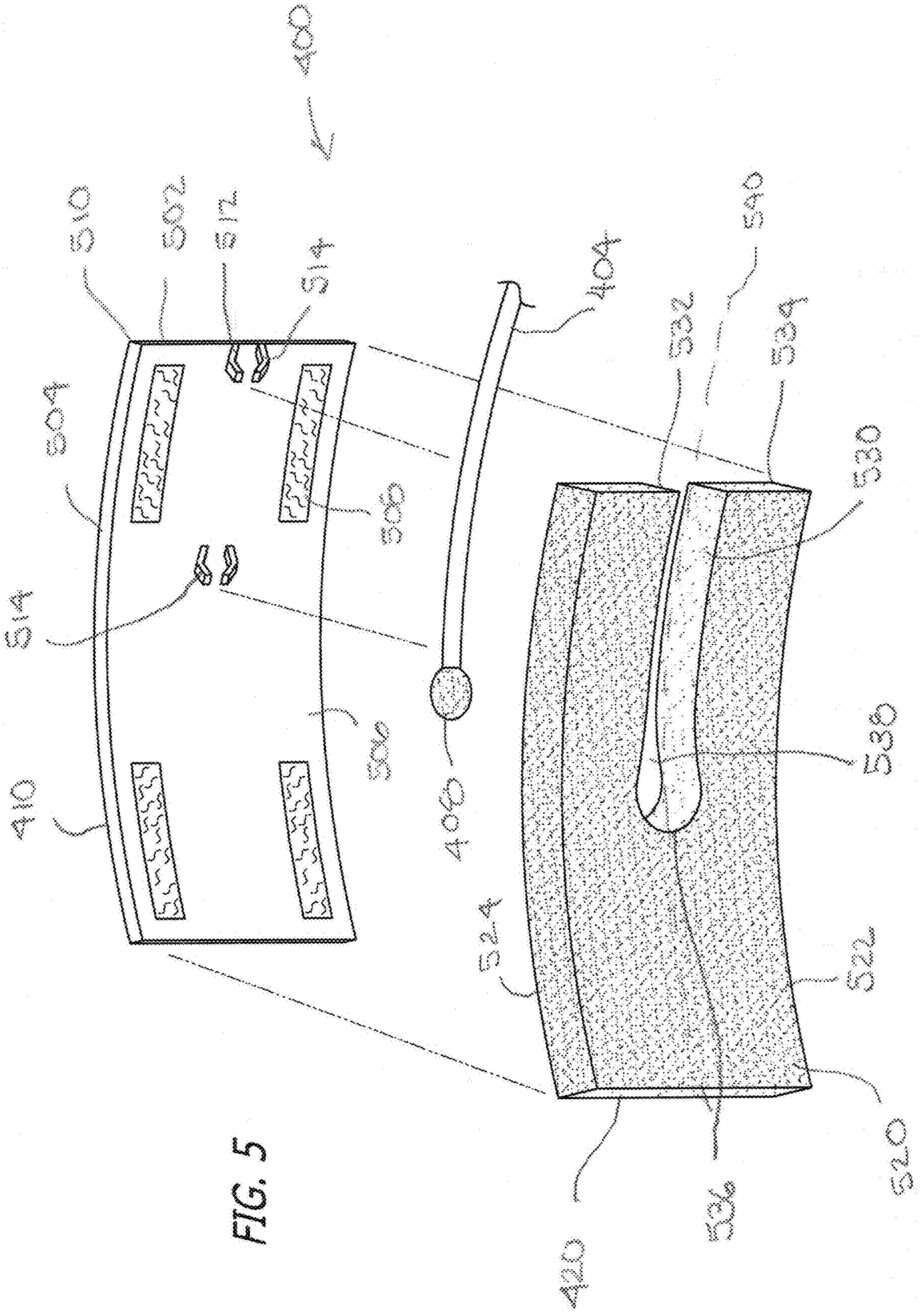
FIG. 5 is an exploded view of the sound conditioning device of FIG. 4.

FIG. 5 is an exploded view of the sound conditioning device 400. As shown, the shield 410 may comprise an elongated planar plate 502 having a front face 504 and a rear face 506. In some embodiments, the plate 602 may be constructed to a height of 3 inches, a width of 6 inches, and a thickness of 0.125 inches. In some embodiments, the corners 510 of the plate 502 may be rounded (not shown) for ornamental and/or safety purposes.

In preferred embodiments, the plate 502 may be constructed to comprise a slightly concave curvature. Such construction is helpful in shielding a headset microphone from ambient sound or air. The plate 502 may be made of aluminum, stainless steel, plastic, ceramic, or any other suitable material.

In some implementations, words, logos, or images may be inscribed on the front face 504 of the shield 410. In other implementations, hook and loop material 508 may be affixed to the rear face 506 at various locations to secure the conditioning material 420 to the shield 410. The hook and loop material 508 may be affixed to the rear face 506 by glue, bond, or any other suitable adhesive.

A fastener 512 may be affixed to the rear face 506 of the shield 410. In the embodiment shown, the fastener 512 comprises a pair of clamp-type fastening clips 514 aligned along a centerline 516 of the plate 502. The fastening clips 514 are adapted to detachably receive a microphone boom of a headset, such that the boom can snap into and be released from the fastening clips 514. The fastening clips 514 are also adapted, by interference fit, to secure the shield 410 to the microphone boom to prevent radial rotation about the boom or slippage of the shield 410 from the boom. For example, a fastening clip 514 may be affixed to the rear face 506 at a location corresponding to the distal end of the microphone boom 404, such that the fastening clip 514 may be coupled to the boom near the voice microphone to prevent shield slippage. In other implementations, the fastener 512 may comprise vices, brackets, restraining straps, or any other suitable means. While it is preferred that the shield 410 is detachably coupled to the microphone boom, in some implementations, the shield 410 may be permanently attached to the microphone boom.

As shown, the sound conditioning material 420 may include a planar sheet of pliable material 520 having a front surface 522 and a rear surface 524. In some embodiments, the sheet 520 may be constructed to a height of 3 inches, a width of 6 inches, and a thickness of 0.5 to 0.75 inches. The planar sheet 520 may be made of acoustic foam, rubber, cloth, or any other suitable sound-absorbing material. The sheet 520 may be constructed of flexible material such that it may conform to the concave curvature of the shield plate 502 when it is attached thereto. In some embodiments, the edges of the sheet 520 may also be rounded (not shown) to correspond to rounded edges of the shield plate 502.

The front surface 522 of the sound conditioning material 420 is adapted to be positioned near the user's mouth. The front surface 522 may include a plurality of ridges, egg crate, or cone-shaped constructions (not shown) to shape or condition the sound waves passing therethrough.

The rear surface 524 of the sound conditioning material 420 is adapted to abut the rear face 506 of the shield 410. In some implementations, hook and loop material (not sown) may be affixed to the rear surface at locations corresponding to hook and loop material 508 on the rear face 506 of the shield 410. The hook and loop material may be affixed to the rear surface 524 by glue, bond, or any other suitable adhesive. The hook and loop material enables the sound conditioning material 420 to be detachably coupled to the shield 410 for sanitary purposes. Namely, the hook and loop material enables the sound conditioning material 420 to be detached from the shield 410 and discarded after each use.

In other implementations, the sound conditioning material 420 may be permanently affixed to the shield 410 for heavy duty uses.

In this example, a groove 530 may be formed along a centerline of the 540 of the sheet 520. The groove 530 extends from an open end 534 formed at an outer end 532 of the sheet 520 inwards to a closed end 536 formed in central portion of the sheet 520. The groove 520 may be constructed to extend in depth from the front surface 522 to the rear surface 524, thereby defining a pocket 538 for receiving the microphone boom 404 of the headset 402.

In use, the shield 410 may first be attached to microphone boom 404 by snapping the boom into the fastening clips 514. Similar to the previous example, it is preferred to construct the shield 410 such that a fastening clip 514 is positioned near the voice microphone 406 of the microphone boom 104 (as shown in FIG. 4) to minimize lateral movement of shield 410 along the microphone boom 404. In the same way, the closed end 536 of the pocket 538 also limits the lateral movement of the shield 410 along the microphone boom 404.

According to this example, unconditioned direct sound 430 (FIG. 4) propagating from the user's mouth substantially perpendicular to the voice microphone 406 (i.e., the user's voice), is detected by voice microphone 406, while ambient sound 440, propagating from other angles relative to the voice microphone 406, is conditioned by the conditioning material 420 such that it is not detected by the voice microphone 406.

The present disclosure is an ideal device for sports coaches, construction workers, aircraft operators or technicians, or any persons working in a noisy or windy environment. The present disclosure not only conditions ambient sound detected by a headset voice microphone, but the present disclosure provides the additional benefit of obstructing the user's mouth to prevent persons, such as personnel from an opposing sports team, from reading the user's lips or hearing what they user is saying as the user is communicating sensitive information through the voice microphone.

In general, terms such as "coupled to," and "configured for coupling to," and "secured to," and "configured for securing to" and "in communication with" (for example, a first component is "coupled to" or "is configured for coupling to" or is "configured for securing to" or is "in communication with" a second component) are used herein to indicate a structural, functional, mechanical, electrical, signal, optical, magnetic, electromagnetic, ionic or fluidic relationship between two or more components or elements. As such, the fact that one component is said to be in communication with a second component is not intended to exclude the possibility that additional components may be present between, and/or operatively associated or engaged with, the first and second components.

Although the previous description illustrates particular examples of various implementations, the present disclosure is not limited to the foregoing illustrative examples. A person skilled in the art is aware that the disclosure as defined by the appended claims and their equivalents can be applied in various further implementations and modifications. In particular, a combination of the various features of the described implementations is possible, as far as these features are not in contradiction with each other. Accordingly, the foregoing description of implementations has been presented for purposes of illustration and description. Modifications and variations are possible in light of the above description.

What is claimed is:

1. A sound conditioning device, comprising:

a shield comprising an elongated plate having a front face and a rear face;

a fastener coupled to the rear face of the shield, where the fastener is adapted to detachably couple to a boom of a headset having a voice microphone;

a sound conditioning material coupled to the rear face, wherein the conditioning material overlays the voice microphone to encapsulate the voice microphone and suppress ambient sound detected by the microphone.

2. The sound conditioning device of claim 1, wherein the sound conditioning material comprises a planar sheet of sound-absorbing material.

3. The sound conditioning device of claim 2, wherein sound conditioning material includes a groove extending inward from an outer end of the plana sheet of material to a closed end formed in a central portion of the material, the groove being constructed to a depth short of the thickness of the material, thereby defining a sleeve for receiving and enclosing the voice microphone.

4. The sound conditioning device of claim 1, wherein the sound conditioning material is detachably coupled to the rear face for sanitary purposes.

5. The sound conditioning device of claim 4, wherein the sound conditioning material is detachably coupled to the rear face by hook and loop fasteners.

6. The sound conditioning device of claim 1, wherein the fastener comprises two or more fastening clips attached to the rear face of the shield.

7. A sound conditioning device, comprising:

a shield comprising an elongated plate having a front face and a rear face;

a fastener coupled to the rear face of the shield, where the fastener is adapted to detachably couple to a boom of a headset having a voice microphone;

a sound conditioning material coupled to the rear face, wherein the conditioning material comprises a pocket for receiving the voice microphone to partially enclose the voice microphone to suppress ambient sound detected by the microphone.

8. The sound conditioning device of claim 7, wherein the sound conditioning material comprises a planar sheet of sound-absorbing material.

9. The sound conditioning device of claim 8, wherein the pocket is defined by a cut-out groove extending from a side of the planar sheet of material to a central region of the material.

10. The sound conditioning device of claim 7, wherein the sound conditioning material is detachably coupled to the rear face for sanitary purposes.

11. The sound conditioning device of claim 10, wherein the sound conditioning material is detachably coupled to the rear face by hook and loop fasteners.

12. The sound conditioning device of claim 7, wherein the fastener comprises two or more fastening clips attached to the rear face of the shield.

* * * * *